United States Patent [19]

Souza

[11] 4,138,796
[45] Feb. 13, 1979

[54] REPEATING ANIMAL TRAP ASSEMBLY

[75] Inventor: Anthony J. Souza, Lancaster, Pa.

[73] Assignee: Woodstream Corporation, Lititz, Pa.

[21] Appl. No.: 783,318

[22] Filed: Mar. 31, 1977

[51] Int. Cl.² ............................................. A01M 23/02
[52] U.S. Cl. .............................................. 43/61; 43/67
[58] Field of Search ........................................ 43/61, 67

[56] References Cited
U.S. PATENT DOCUMENTS

| | | | |
|---|---|---|---|
| 760,738 | 5/1904 | Huguley | 43/67 |
| 1,102,896 | 7/1914 | Fischer | 43/67 |
| 1,349,453 | 8/1920 | Hall | 43/67 |
| 1,488,312 | 3/1924 | Bronson | 43/67 X |
| 1,602,677 | 10/1926 | Jorgensen | 43/67 |
| 1,726,351 | 8/1929 | Hoge | 43/67 X |
| 2,387,328 | 10/1945 | Horowitz | 43/67 |
| 2,583,116 | 1/1952 | Morici | 43/67 |
| 3,415,006 | 12/1968 | Gilbaugh | 43/67 |

Primary Examiner—Harold D. Whitehead
Attorney, Agent, or Firm—Holman & Stern

[57] ABSTRACT

A repeating animal trap assembly comprising a capture unit and a holding unit with means releasably associating the two units. The capture unit defines a compartment having at least one entry opening and at least one exit opening. The holding unit defines an enlarged compartment having an entry opening which in the assembled relationship of the units is aligned with the exit opening of the capture unit to provide communication between the compartments in the two units. Doors are provided for the capture unit entry and exit openings with means for automatically closing the entry doors and opening the exit door when an animal is totally within the capture unit compartment. Preferably, the animal is frightened by a light flashing and passes into the holding unit compartment where further means are actuated to automatically close the exit door and open the entry doors to the capture unit compartment so that additional animals may be captured. Both electrical and mechanical means are disclosed to operate the various doors and in the preferred embodiments the doors are balanced so that they remain in a given position once they have been moved to that position without expending any energy until the actuating means are again energized to move the doors to their alternate position.

22 Claims, 9 Drawing Figures

REPEATING ANIMAL TRAP ASSEMBLY

BACKGROUND OF THE INVENTION

This invention relates to a repeating animal trap assembly and relates more particularly to a mouse or rat trap adapted to catch and confine a number of animals while automatically resetting itself.

Although the concepts of the instant invention are equally applicable to traps for animals of any size, devices of this type are primarily utilized in connection with the trapping of mice and rats. Repeating animal traps have been known heretofore, many such prior art traps being of the inclined plane type wherein the weight of an animal is utilized to move various elements within the trap blocking escape until the animal is confined and then automatically resetting the trap to enable the capture of additional animals.

Such prior art devices are quite useful for many applications, but in some instances have been rather complicated to manufacture increasing the manufacturing costs and, additionally, resulting in more frequent break-downs minimizing the effectiveness and increasing the cost of maintenance with such devices.

Yet, there is still a need for a repeating animal trap particularly adapted for large scale commercial use which provides for positive powered actuation of the trapping mechanisms.

Moreover, there remains a need for an industrial level repeating animal trap which is modular in construction so that individual portions can be readily replaced either for maintenance purposes or during disposal of captured animals.

SUMMARY OF THE INVENTION

It is therefore a primary object of this invention to provide a repeating animal trap assembly which is modular in construction having separable capture and holding units which when associated with each other produce a compact, highly efficient apparatus.

A further object of this invention is the provision of a repeating animal trap assembly wherein the automatic operation of the various trap doors is either electrically or mechanically actuated with a minimum of energy requirement so as to ensure a long life and low level of maintenance requirement.

Along the same lines, it is an object of this invention to provide a device of the type described wherein the various trap doors are weight balanced so as to maintain them in a given position until moved by the presence of an animal within the trap and then, once moved to an alternate position, to maintain them in that position without expenditure of further energy until another animal enters the trap.

Yet a further object of the instant inventive concept is to provide a repeating animal trap assembly which ensures positive capture of an animal once it has passed fully within the trap with no means of escape.

Another object of this invention is to provide a simple, but highly efficient, mechanism for actuating the various doors so as to minimize the cost of manufacture and maintenance of the assembly.

Still another object of this invention is to provide a modular repeating animal trap wherein the capture unit and the holding unit may be placed at remote locations, such as on opposite sides of a building wall, enabling the capture of animals within a building and the removal of the animals from the assembly outside the building.

A further feature of the assembly, according to this invention in a preferred embodiment, is to provide light means associated with the device so that when the animal is within the capture unit it will be frightened by a flashing light causing the animal to quickly run into the holding unit enabling the device to be available for capture of further animals as expeditiously as possible.

Other and further objects of this invention reside in the combination of elements, arrangement of parts and features of construction. Still other objects will in part be obvious and in part be pointed out as the description of the invention proceeds and as will be seen from the accompanying drawings.

BRIEF DESCRIPTION OF THE DRAWINGS

FIG. 9 is a schematic representation of a repeating animal trap assembly according to the instant inventive concepts wherein the capture unit and the holding unit are remotely located on opposite sides of a building wall or the like.

DETAILED DESCRIPTION OF THE PREFERRED EMBODIMENTS

Like reference numerals refer to like parts throughout the several views of the drawings.

Referring now to the drawings, and particularly to the embodiment of FIGS. 1-7, a repeating animal trap assembly according to the instant inventive concept is designated generally by the reference numeral 10 and will be seen to comprise a capture unit means designated generally by the reference numeral 12, and a holding unit means designated generally by the reference numeral 14. In the assembled relationship shown in FIG. 1, the capture unit 12 and the holding unit 14 are releasably secured to each other in associated relationship by any conventional latch means such as designated by the reference numeral 16. It is to be understood that although, according to the preferred embodiments of this invention, the capture and holding units are separable so as to enable either unit to be readily replaced for maintence or for removal of captured animals, in the broadest concepts of this invention the units may be integrally formed or permanently affixed.

The capture unit 12 comprises basically a housing means designated generally by the reference numeral 18, which in the embodiment shown includes a removable cover portion 20 and internal frame portion 22 defining an elongated capture unit compartment 24 having entry openings 26, 28 at opposite ends, and an exit opening 30 intermediate the ends and substantially at right angles to the elongated compartment 24. Entry door means 32, 34 and exit door means 36 are slidably supported in the frame 22 in an obvious manner and for a purpose to be described in more detail hereinafter.

The capture unit means 12 further includes an actuating means designated generally by the reference numeral 38 and in the embodiment shown comprising a pair of lever arms 40, 42 and a pair of solenoids 44, 46.

The actuating means 38 are operatively associated with a power means which, in the embodiment shown takes the form of a D.C. battery 48.

Finally, the capture unit 12 includes, as a basic component, trigger means designated generally by the reference numeral 50 to initiate the power means 48 to cause movement of the actuating means 38 in a manner and for a purpose to be described in more detail hereinafter. The trigger means 50 comprises a pair of normally opened micro switches 52, 54 (note particularly FIGS. 2 and 6) associated respectively with a treadle means 56 and a door 58 closing a passageway between the capture and holding unit compartments as will be described in further detail hereafter.

The holding unit means 14 comprises basically a housing 60 which defines within it a holding unit compartment 62 having a holding unit entry opening 64 and in the embodiment shown including a cover member 66 hinged at one edge 68 and closable as by a latching means 70 to provide access to the holding unit compartment 62 for removal of captured animals.

If desired, a handle means, such as shown at 72, may be incorporated on either or both units to enable the individual units or the assembled units to be readily carried from place to place.

Figure 5:
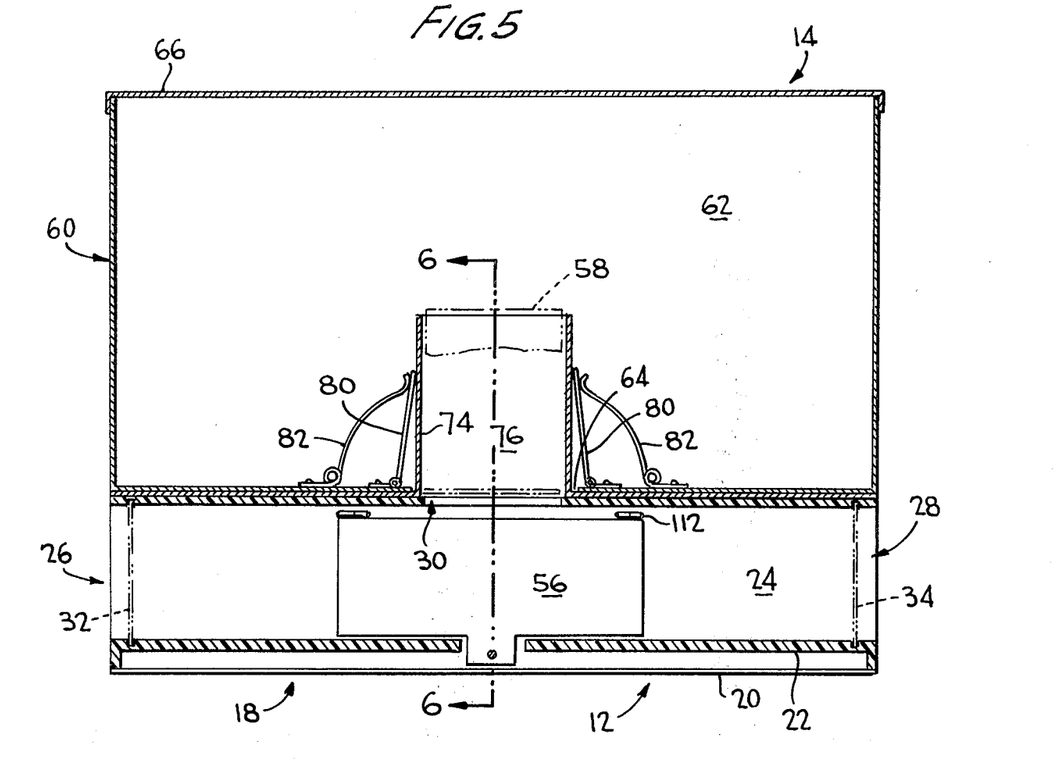
FIG. 5 is a sectional view of the assembled unit taken substantially along lines 5—5 of FIG. 1.

According to the preferred embodiment shown, a passageway means 74 defines a passageway 76 extending at right angles to the elongated dimension of the capture unit compartment 24 and in the assembled relationship of the units as shown particularly in FIG. 5, having portions passing through the holding unit entry opening 64 into the holding unit compartment 62 to establish communication between the capture unit compartment 24 and the holding unit compartment 62. The door means 58 referred to previously will be seen as hingedly attached at its upper end 78 to the passageway means 74 and as normally resting under its own weight on the walls of the passageway means in the position shown in FIG. 6 in which it substantially blocks the end of the passageway means within the holding unit compartment 62. In this position, it will be seen that the door rests on the micro switch means 54, maintaining the micro switch means 54 in its normally open position.

In order to preclude escape of animals confined within the holding unit compartment 62 on disassembly of the capture and holding units 12, 14, respectively, holding unit entry door means 80 are hingedly secured adjacent the holding unit entry opening 64 and biased by spring means 82 toward a position which would block or close the holding unit entry opening 64. However, as will be seen particularly in FIG. 5, when the units are assembled the passageway means 74 pushes the holding unit entry door means 80 open to provide access between the capture unit compartment 24 and the holding unit compartment 62. When the units are separated the spring means 82 close the door means automatically thereby completely confining captured animals within the holding unit compartment 62.

Returning now to the actuating means 38, it will be seen that the lever member 40 has one end pivotally secured as by a lost motion hinge means 84 to the top of the capture unit entry door means 34, while the lever member 42 has a similar connection at 86 to the other capture unit entry door means 32. The opposite ends of the lever members 40, 42 are pivotally secured as by a common lost motion hinge 88 to the top of the capture unit exit door means 36. Each lever means is pivotally supported intermediate its ends as by pivot means 90, 92 in such a manner that rocking of either lever member about its respective pivot means will automatically result in a reverse rocking of the other lever member about its respective hinge means through the intermediary of the common connection to the capture unit exit door means 36.

Figure 3:
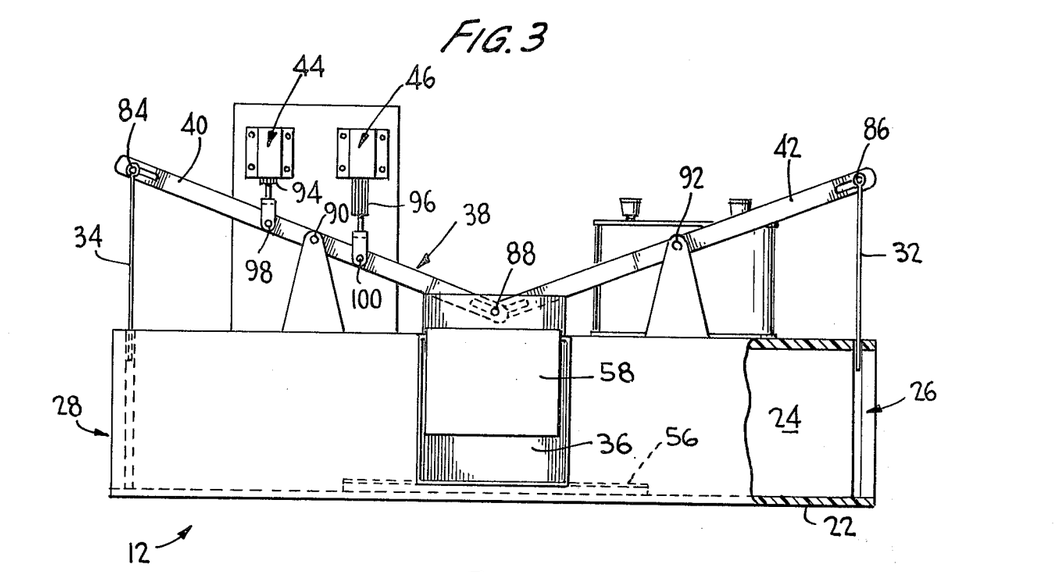
FIG. 3 is a side elevational view of the internal portions of the capture unit taken substantially along lines 3—3 of FIG. 2.
Figure 4:
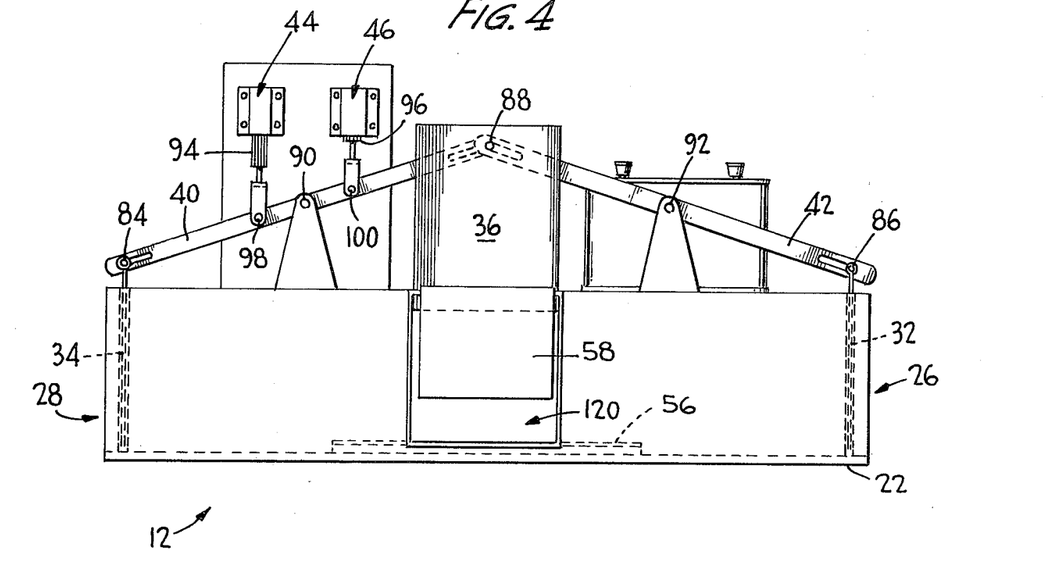
FIG. 4 is a view similar to Figure, with the operating elements of the capture unit in an alternate position.

By particularly comparing FIGS. 3 and 4 it will be seen that with the lever members 40, 42 in the position shown in FIG. 3, the capture unit entry door means 32, 34 are in a raised or opened position unblocking the capture unit entry openings 26, 28, while the capture unit exit door means 36 is in a lowered position blocking the capture unit exit opening 30, whereas with the lever members 40, 42 in the position shown in FIG. 4, the capture unit entry openings 26, 28 are blocked by the capture unit entry door means 32, 34, respectively, and the capture unit exit opening 30 is unblocked since the capture unit exit door means 36 has been raised.

Rocking of the lever means 40, 42 between the respective positions shown in FIGS. 3 and 4 is conveniently accomplished by the solenoids 44, 46 which include core elements 94, 96, respectively, the end portions of which are pivotally secured as at 98, 100 to the lever member 40 on opposite sides of the pivot member 90. Of course, the solenoid means 44, 46 includes conventional coil elements 95, 97 (note FIG. 7) surrounding their respective coils. Thus, when the solenoid 44 is energized its core member 94 is urged downwardly to move the lever members 40, 42 to the position shown in FIG. 4, and when the solenoid 46 is energized its core member 96 is moved downwardly to move the lever members 40, 42 to the position shown in FIG. 3.

While two separate solenoids have been shown as operatively connected to opposite sides of the pivot member of one of the lever members, it should be understood that, in the broader aspects of the invention, a single solenoid could be utilized having a pair of electrical coils with opposite windings to enable movement of its core member in either direction by energizing a selective coil. Additionally, if two solenoids are utilized, their respective coil elements could be operatively associated with different lever means in an obvious manner to perform the same basic function.

Figure 7:
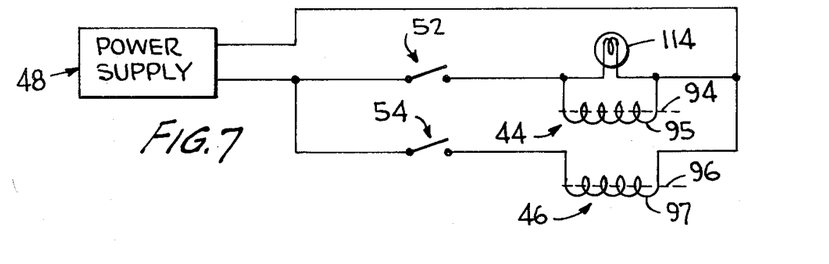
FIG. 7 is a schematic view of the circuitry utilized in the embodiment of FIGS. 1-6.

Energizing of the solenoid 44 from the power means 48 is accomplished by closing the micro switch means 52 as will be seen from the schematic electrical diagram shown in FIG. 7. Similarly, energizing of the solenoid means 46 occurs when the micro switch means 54 is closed.

As indicated previously, the micro switch means 52 is maintained in a normally opened position and is closed by engagement with an element 102 secured to a rod 104 slidably carried in a bracket 106 secured to the frame 22, having its lower end 108 fixed to the treadle means 56, with spring means 110 normally urging the treadle means 56 in an upwardly direction about its pivotal support 112 at which point the element 102 does not engage the micro switch means 52. Note particularly FIGS. 2 and 6. However, when an animal has entered the capture unit compartment 24 and is fully within the entry door, it will engage and step on the treadle means 56, lowering the same against the urging of the spring means 110 and causing engagement of the element 102 with the micro switch means 52 to close the same and complete the circuit through the solenoid means 44, pushing the lever members to the position shown in FIG. 4. At this point, the animal is totally confined within the capture unit compartment 24, although the capture unit exit opening 30 is unblocked.

Figures 1, 2:
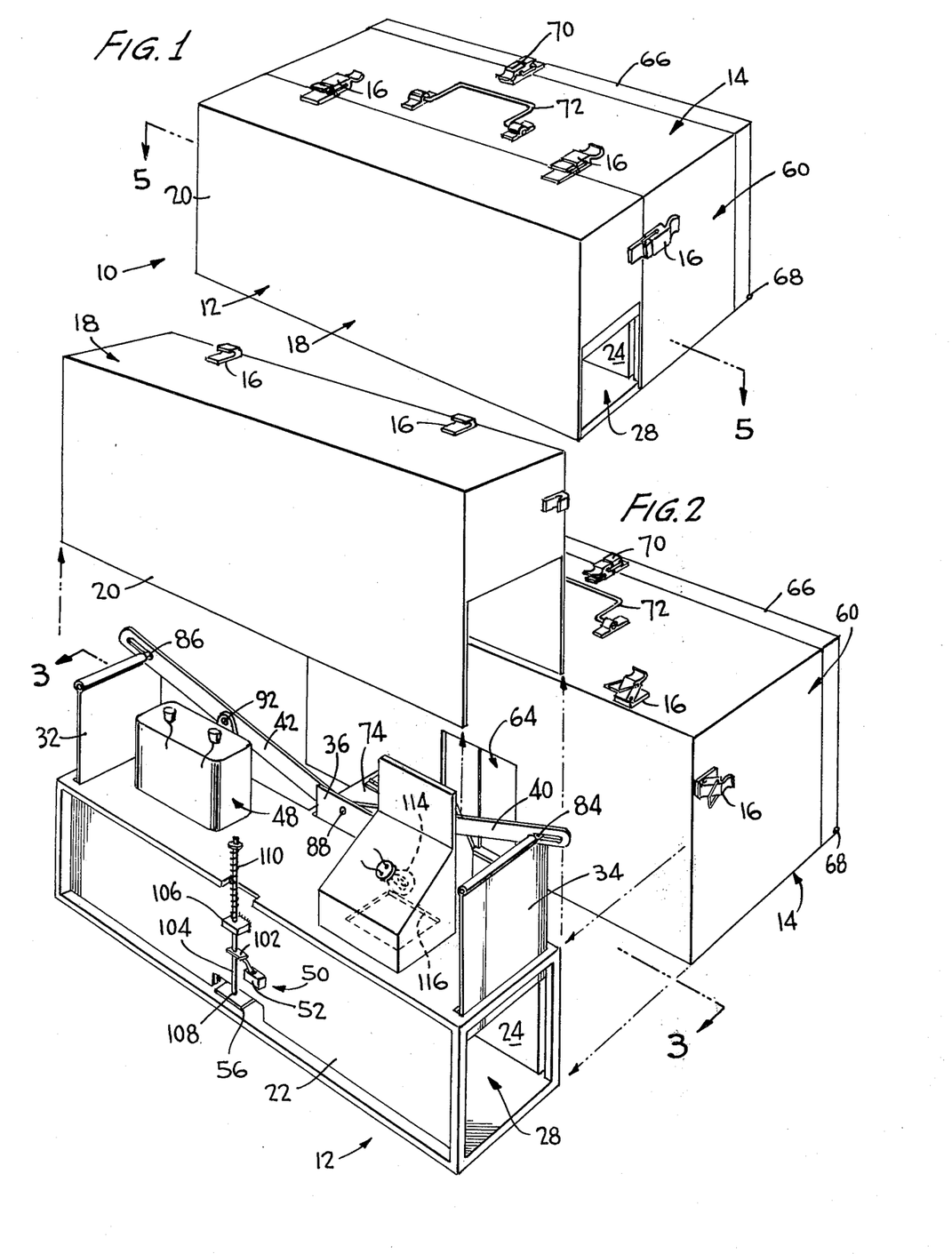
FIG. 1 is a perspective view of one embodiment of the repeating trap assembly according to the instant inventive concept.
FIG. 2 is an exploded view thereof.

According to a preferred embodiment of the instant inventive concept, a light means 114 is included in the circuit with the micro switch means 52 so that on closing the micro switch means 52 the light means 114 is energized and a flash of light passes downwardly into the capture unit compartment 24 through an opening in the top thereof as shown in dotted lines at 116 in FIG. 2. This flash of light frightens the animal causing it to pass through the capture unit exit opening 30 into the passageway 76.

Once the animal steps from the treadle means 56, the spring means 110 will return it to its original or raised position opening the micro switch means 52 and breaking the circuit to the light means 114, as well as the solenoid means 44. Yet, since in the preferred embodiment of this invention, the weight of the capture unit exit door means 36 is substantially equal to the total combined weight of the capture unit entry door means 32, 34, the lever members 40, 42 and the door means will remain in the position of FIG. 4 even though no further energy is flowing to the solenoid means 44.

Figure 6:
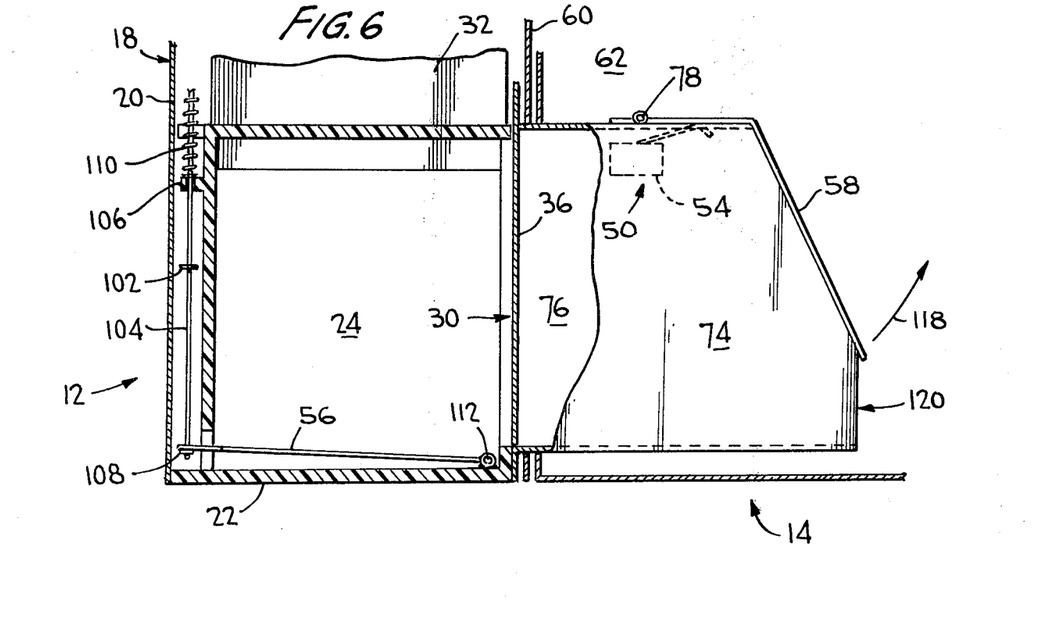
FIG. 6 is a fragmentary enlarged cross-sectional view taken substantially along lines 6—6 of FIG. 5.

As the animal passes through the passageway 76 it encounters the door means 58 which, as will be seen particularly in FIG. 6, has a slanted forward face facilitating lifting of the door means 58 about the hinge means 78 in the direction of the arrow 118 of FIG. 6 so that the animal can pass into the holding unit compartment 62. As soon as the door means 58 is moved upwardly, the micro switch means 54 closes thereby completing the circuit to the solenoid means 46 and moving the lever members 40, 42 and the respective door means to the position shown in FIG. 3. At this point, the animal can no longer re-enter the capture unit compartment 24, since the capture unit exit opening 30 is blocked by the capture unit exit door means 36.

Once the animal has passed under the door means 58 it will be confined within the holding unit compartment 62 and the door means, under influence of its own weight, will return to the position shown in FIG. 6, the space 120 beneath the door means being inadequate for the animal to return to the passageway 76. The door means is designed to provide the opening 120 so that an animal within the passageway 76 will appear to have an escape if it continues in that direction. In any event, even if an animal within the holding unit compartment 62 is capable of raising the door means 58 by nudging it upwardly, it will be blocked from re-entry into the capture unit compartment 24 by the capture unit exit door means 36.

Once a number of animals have been captured within the holding unit compartment 62, the cover member 66 may be opened to remove the animals or, preferably, the entire holding unit 14 may be separated from the capture unit 12 and replaced by an empty holding unit into so that the animals can be removed and disposed of in any desired manner at a remote location. It should be noted that it is never necessary to touch the animals since they can merely be dumped from a holding unit a body of water and drowned. Alternatively, a poisoned food can be maintained within the holding unit compartment 62.

Additionally, the repeating animal trap assembly can be baited in any desired manner, the bait being placed, for example, on the treadle means 56 to attract animals into the capture unit compartment 24.

Figure 9:
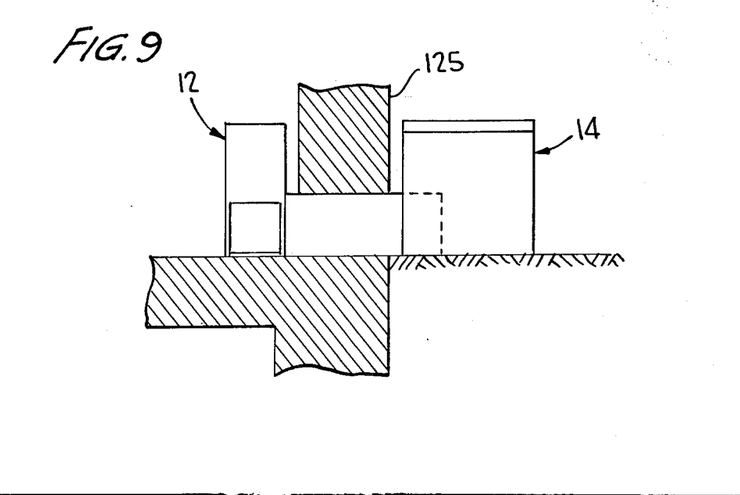

By reference to FIG. 9, it will be seen that the passageway means 74 can be sufficiently elongated so as to pass through an opening in a building wall schematically shown at 125. In this manner, a number of capture units 12 can be placed within a building, such as a warehouse or a factory, with the animals passing through the building wall 125 into holding units 14 located exteriorly of the building. This enables an exterminator or the like to constantly remove captured animals without ever having to enter the building, replacing the holding units with empty modules as necessary.

Figure 8:
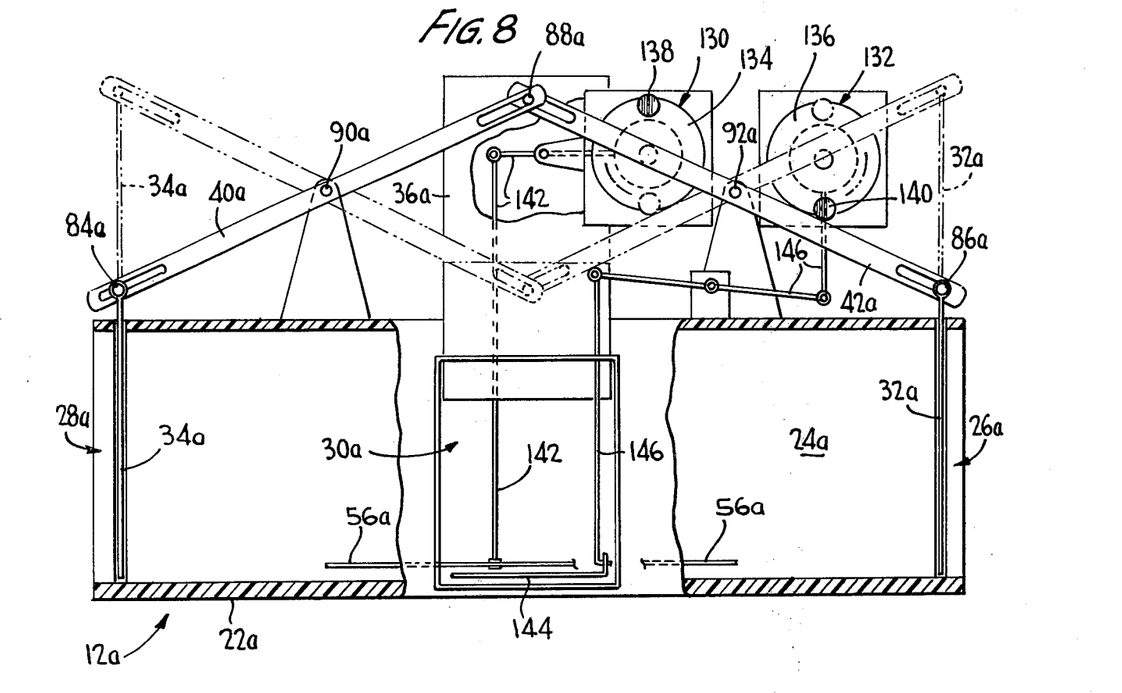
FIG. 8 is a view of a modified capture unit embodiment, partially in cross-section and partially in elevation, with the operating elements being shown in alternate positions in dotted lines.

Reference is now made to FIG. 8, in which a mechanically operated embodiment of a repeating animal trap assembly in accordance with the concepts of the instant invention is shown. Since many elements of the embodiment of FIG. 8 are similar to or the same as the embodiment of FIGS. 1-7, such elements will be marked with the same reference numeral followed by the suffix "a" for ease of understanding.

In the embodiment of FIG. 8, the power for movement of the lever member 40a, 42a is provided by a pair of spring-actuated windup motor means 130, 132. Such devices are conventional and could include springs of the coil torsion type or the flat clock-like motor springs. In any event, devices of this nature commonly incorporate a conventional escapement means which, when actuated, releases the spring means and permits the motor means to rotate about its axis to a point determined by the relative dimensions of the escapement means. In the preferred embodiment of this invention shown in FIG. 8, the escapement means is designed to permit one full rotation each time the motor means is actuated. Details of this device are not disclosed since any common spring-actuated windup motor means having a conventional escapement arrangement could be utilized.

Each motor means 130, 132 is provided with a disc or plate 134, 136 carrying a pin means 138, 140 extending outwardly therefrom, so that the pin means rotates in the direction of the arrows shown on the discs 134, 136 when the motor means 130, 132 are actuated.

It will be seen that the pin means 138, 140 are so arranged as to engage the lever member 42a on opposite sides of its pivot member 92a during rotation to move the lever members 40a and 42a and the associated door means from the full line position shown in FIG. 8 which corresponds to the arrangement shown in FIG. 4 for the previous embodiment, to the dotted line position shown in FIG. 8 which corresponds to the arrangement of the elements shown in FIG. 3 for the earlier embodiment.

The escapement means are actuated, in the embodiment of FIG. 8, by any conventional linkage triggered in any of a variety of manners. For example, linkage means 142 are shown as secured to a portion of the treadle means 56a so as to energize the motor means 130 when an animal steps on the treadle means 56a within the capture unit compartment 24a to move the lever members 40a, 42a and the associated door means to the dotted line position shown in FIG. 8. A further treadle means 144 can be provided within the passageway between the capture and holding unit compartments with linkage means 146 adapted to energize the motor means 132 once the animal has passed through the capture unit exit opening 30a, thereby returning the lever members 40a, 42a and the associate door means to the solid line position shown in FIG. 8.

Except for the substitution of mechanical power means for the electrical power means of the embodiment of FIGS. 1-7, the embodiment of FIG. 8 operates in a comparable manner as will be readily understood by those skilled in the art.

The manner of operation of a repeating animal trap assembly according to any of the embodiments of this invention is believed readily understood from the foregoing detailed description. Moreover, one with ordinary skill in the art could obviously modify the construction to utilize alternating current power means or other well known mechanical power means for those shown and described above without departing from the instant inventive concepts.

The various elements of the apparatus may be made from any conventional material including metal, plastic or comparable materials of manufacture.

It will now be seen that there is herein provided a repeating animal trap assembly which is quite versatile in operation, extremely efficient, simple and inexpensive to manufacture and maintain and which satifies all of the objectives of the instant inventive concepts identified above, and others, including many advantages of great practical utility and commercial importance.

The embodiments of the invention in which an exclusive property or privilege is claimed are defined as follows:

1. A repeating animal trap assembly comprising:
   (a) a capture unit means;
   (b) a holding unit means; and
   (c) means associating said capture unit means with said holding unit means;
   said capture unit means including:
   (i) capture unit housing means comprising portions defining a capture unit compartment having at least one capture unit entry opening and a capture unit exit opening;
   (ii) capture unit entry door means for each capture unit entry opening;
   (iii) capture unit exit door means for said capture unit exit opening;
   (iv) means supporting each capture unit entry door means for movement between an opened position in which its associated capture unit entry opening is unblocked to permit entry of an animal into said capture unit compartment therethrough, and a closed position in which said capture unit entry opening is blocked by said capture unit door means;
   (v) means supporting said capture unit exit door means for movement between a closed position in which said capture unit exit opening is blocked by said capture unit exit door means to preclude re-entry of an animal into said capture unit compartment therethrough, and an opened position in which said capture unit exit opening is unblocked;
   (vi) actuating means operatively associated with said capture unit entry and exit door means to move said door means between their respective opened and closed positions, said capture unit entry door means being in its opened position when said capture unit exit door means is in its closed position, and said capture unit entry door means being in its closed position when said capture unit exit door means is in its opened position;
   (vii) power means operatively associated with said actuating means to cause said actuating means to move said capture unit entry and exit door means between their respective positions;
   (viii) passageway means defining a passageway having one end communicating with said capture unit compartment through said capture unit exit opening, said passageway means extending outwardly from said capture unit compartment; and
   (ix) first and second independently operable trigger means operatively associated with said power means and first and second operating means for said first and second trigger means respectively, said first operating means being located within said capture unit compartment to cause said first trigger means to initiate said power means to cause said actuating means to move said capture unit entry door means to its closed position and to move said capture unit exit door means to its opened position when an animal is fully within said capture unit compartment, thereby precluding escape of an animal from said capture unit compartment except through said capture unit exit opening, and said second operating means being located within said passageway at a distance from said capture unit exit opening to cause said second trigger means to initiate said power means to cause said actuating means to move said capture unit entry door means to its opened position and to move said capture unit exit door means to its closed position after an animal has passed through said capture unit exit opening, thereby precluding re-entry of an animal to said capture unit compartment therethrough, while permitting an additional animal to enter said capture unit compartment through a capture unit entry opening;
   said holding unit means including:
   (i) holding unit housing means comprising portions defining a holding unit compartment having a holding unit entry opening,
   said means associating said capture unit means with said holding unit means aligning said units such that said capture unit compartment communicates with said holding unit compartment by said passageway means passing through said holding unit entry opening.

2. The assembly of claim 1 wherein said capture unit means and said holding unit means are separably secured to each other to permit ready replacement of either unit.

3. The assembly of claim 2 wherein said holding unit means further includes holding unit entry door means, and means automatically closing said holding unit entry door means to block said holding unit entry opening on separation of said units, thereby precluding escape of captured animals from said holding unit compartment.

4. The assembly of claim 1 wherein said passageway means is elongated to enable said capture unit means and said holding unit means to be positioned at remote locations from each other.

5. The assembly of claim 1 wherein said capture unit housing means defines an elongated capture unit compartment including capture unit entry openings at each end thereof and a capture unit exit opening intermediate said ends, said passageway being substantially perpendicular to the length of said capture unit compartment.

6. The assembly of claim 1 wherein said one end of said passageway means is secured to said capture unit housing means and said other end of said passageway means includes leading portions slidably passable through said holding unit entry opening into said holding unit compartment.

7. The assembly of claim 6 further including holding unit entry door means, resilient means normally urging said holding unit entry door means to a closed position in which said holding unit entry opening is blocked thereby, insertion of said leading portions of said passageway means through said holding unit entry opening pushing said holding unit entry door means out of blocking relationship with respect to said holding unit entry opening to establish communication between said capture unit compartment and said holding unit compartment.

8. The assembly of claim 1 wherein said actuating means comprise lever means having first end portions pivotally secured to a capture unit entry door means and spaced second end portions pivotally secured to said capture unit exit door means, pivot means supporting said lever means intermediate said end portions for rocking movement thereabout, and moving means operatively associated with said lever means in spaced relationship to said pivot means to rock said lever means about said pivot means and thereby move said capture unit entry and exit door means between their respective positions, said power means being operatively associated with said moving means.

9. The assembly of claim 8 wherein said capture unit housing means defines an elongated capture unit compartment including capture unit entry openings at each end thereof and a capture unit exit opening intermediate said ends, said lever means including a pair of lever members each having a first end portion pivotally secured to one of said capture unit entry door means and spaced second end portions pivotally secured to said capture unit exit door means, said pivot means including a pivot member supporting each of said lever members intermediate its respective end portions for rocking movement thereabout, said moving means engaging only one of said lever members, the other of said lever members being rocked about its pivot member through its engagement with said capture unit exit door means in response to rocking movement of said one lever member.

10. The assembly of claim 8 wherein the weight of said capture unit exit door means substantially equals the weight of said capture unit entry door means so that when said lever means is rocked in either direction said door means will stay in their respective positions without additional energy until said lever means is rocked in the opposite direction.

11. The assembly of claim 9 wherein the weight of said capture unit exit door means substantially equals the total weight of both capture unit entry door means so that when said lever means is rocked in either direction said door means will stay in their respective positions without additional energy until said lever means is rocked in the opposite direction.

12. The assembly of claim 8 wherein said power means includes electrical means and said moving means includes solenoid means.

13. The assembly of claim 12 wherein said power means comprises D.C. battery means.

14. The assembly of claim 12 wherein said solenoid means comprises a pair of solenoid members, said solenoid members including core elements having end portions pivotally secured to said lever means on opposite sides of said pivot means and coil elements surrounding said core elements, said first trigger means comprising first normally open switch means which when closed initiates said power means to energize one of said coil elements and move its associated core element and thus rock said lever means in one direction about said pivot means, and said second trigger means comprising second normally open switch means which when closed initiates said power means to energize the other of said coil elements and move its associated core element and thus rock said lever means in the opposite direction about said pivot means.

15. The assembly of claim 14 further including light means, closing of said first switch means energizing said light means to frighten an animal within said capture unit compartment and cause the animal to pass through said capture unit exit opening.

16. The assembly of claim 14 wherein said first operating means includes treadle means within said capture unit compartment operatively associated with said first switch means, the weight of an animal on said treadle means closing said first switch means, and resilient means normally biasing said treadle means to a position in which said first switch means is opened, rocking of said lever means in said one direction closing said capture unit entry door means and opening said capture unit exit door means.

17. The assembly of claim 16 wherein said passageway means has a second end communicating with said holding unit compartment and said second operating means is engageable by an animal at said second end of said passageway, said second switch means being operatively associated with said second switch means to close said second switch means, rocking of said lever means in said opposite direction opening said capture unit entry door means and closing said capture unit exit door means.

18. The assembly of claim 17 wherein said second operating means comprise a passageway door means hingedly secured at its upper end and having a slanted lower portion normally biased by its own weight to a closed position in which said second end of said passageway means is at least substantially blocked, an animal passing through said passageway pushing said passageway door means upwardly to enter said holding unit compartment and thereby closing said second switch means.

19. The assembly of claim 8 wherein said power means includes spring operated windup motor means and said moving means includes pin means operatively associated with said lever means on opposite sides of said pivot means to engage said lever means and rock said lever means about said pivot means when said power means is energized.

20. The assembly of claim 19 wherein said power means includes a pair of spring actuated windup motor means each of which includes a pin means operatively associated with said lever means on opposite sides of said pivot means, said motor means including windup spring means and escapement means operatively associated therewith to selectively release said spring means and rotate its associated pin means through a single rotation when said motor means is energized, said pin means engaging said lever means during its rotation to rock said lever means about its pivot means.

21. The assembly of claim 20 wherein said first operating means includes first treadle means within said capture unit compartment operatively associated with one of said motor means, the weight of an animal on said first treadle means releasing said spring means of said one motor means to rotate said pin means associated with said one motor means through a single rotation and thereby rock said lever means to a position in which said capture unit entry door means is closed and said capture unit exit door means is opened, and said second operating means comprises a second treadle means in said passageway, the weight of an animal on said second treadle means releasing said spring means of the other motor means to rotate said pin means associated with said other motor means through a single rotation and thereby rock sad said lever means in an opposite direction to a position in which said capture unit entry door means is opened and said capture unit exit door means is closed.

22. A repeating animal trap assembly comprising:
(a) a capture unit means;
(b) a holding unit means; and
(c) means releasably associating said capture unit means with said holding unit means;
said capture unit means including:
(i) capture unit housing means comprising portions defining a capture unit compartment having at least one capture unit entry opening and a capture unit exit opening;
(ii) capture unit entry door means for each capture unit entry opening;
(iii) capture unit exit door means for said capture unit exit opening;
(iv) means supporting each capture unit entry door means for movement between an opened position in which its associated capture unit entry opening is unblocked to permit entry of an animal into said capture unit compartment therethrough, and a closed position in which said capture unit entry opening is blocked by said capture unit door means;
(v) means supporting said capture unt exit door means for movement between a closed position in which said capture unit exit opening is blocked by said capture unit exit door means to preclude re-entry of an animal into said capture unit compartment therethrough, and an opened position in which said capture unit exit opening is unblocked;
(vi) actuating means operatively associated with said capture unit entry and exit door means to move said door means between their respective opened and closed positions, said capture unit entry door means being in its opened position when said capture unit exit door means is in its closed position, and said capture unit entry door means being in its closed position when said capture unit exit door means is in its opened position;
(vii) passageway means defining a passageway having one end communicating with said capture unit compartment through said capture unit exit opening, said passageway means extending outwardly from said capture unit compartment; and
(viii) animal operated means to move said capture unit entry door means to its closed position and to move said capture unit exit door means to its opened position when an animal is fully within said capture unit compartment, thereby precluding escape of an animal from said capture unit compartment except through said capture unit exit opening, and to move said capture unit entry door means to its opened position and to move said capture unit exit door means to its closed position after an animal has passed through said capture unit exit opening, thereby precluding re-entry of an animal to said capture unit compartment therethrough, while permitting an additional animal to enter said capture unit compartment through a capture unit entry opening;
said holding unit means including:
(i) holding unit housing means comprising portions defining a holding unit compartment having a holding unit entry opening; and
(ii) holding unit entry door means, resilient means normally urging said holding unit entry door means to a closed position in which said holding unit entry opening is blocked thereby and said means releasably associating said capture unit means with said holding unit means aligning said units such that said capture unit compartment communicates with said holding unit compartment by said passageway means passing through said holding unit entry opening and forcing said holding unit entry door means open in opposition to said resilient means.

* * * * *